United States Patent
Colley

(10) Patent No.: US 9,715,275 B2
(45) Date of Patent: Jul. 25, 2017

(54) APPARATUS, METHOD, COMPUTER PROGRAM AND USER INTERFACE

(75) Inventor: Ashley Colley, Oulu (FI)

(73) Assignee: Nokia Technologies Oy, Espoo (FI)

( * ) Notice: Subject to any disclaimer, the term of this patent is extended or adjusted under 35 U.S.C. 154(b) by 515 days.

(21) Appl. No.: 12/767,344

(22) Filed: Apr. 26, 2010

(65) Prior Publication Data

US 2011/0260985 A1    Oct. 27, 2011

(51) Int. Cl.
*G06F 3/041*  (2006.01)
*G06F 3/01*   (2006.01)

(52) U.S. Cl.
CPC .............. *G06F 3/016* (2013.01); *G06F 3/041* (2013.01); *G06F 2203/014* (2013.01)

(58) Field of Classification Search
USPC .......................................... 345/156, 173–178
See application file for complete search history.

(56) References Cited

U.S. PATENT DOCUMENTS

| | | |
|---|---|---|
| 7,196,688 B2 | 3/2007 | Schena |
| 7,567,681 B2 | 7/2009 | Pelrine et al. |
| 7,952,566 B2 | 5/2011 | Poupyrev et al. |
| 8,378,798 B2 | 2/2013 | Bells et al. |
| 8,407,623 B2 | 3/2013 | Kerr et al. |
| 8,749,495 B2 | 6/2014 | Grant et al. |
| 8,954,887 B1 | 2/2015 | Tseng et al. |
| 9,387,395 B2 | 7/2016 | Rom et al. |
| 2002/0054060 A1 | 5/2002 | Schena |
| 2004/0017376 A1 | 1/2004 | Tagliabue et al. |
| 2004/0164971 A1 | 8/2004 | Hayward et al. |
| 2004/0169674 A1 | 9/2004 | Linjama |
| 2004/0216059 A1 | 10/2004 | Vong et al. |
| 2005/0024341 A1 | 2/2005 | Gillespie et al. |
| 2005/0030292 A1 | 2/2005 | Diederiks |
| 2005/0057528 A1 | 3/2005 | Kleen |
| 2005/0088417 A1 | 4/2005 | Mulligan |
| 2005/0156904 A1 | 7/2005 | Katayose |
| 2005/0168449 A1 | 8/2005 | Katayose |
| 2006/0066569 A1 | 3/2006 | Eid et al. |

(Continued)

FOREIGN PATENT DOCUMENTS

| | | |
|---|---|---|
| CN | 1678978 A | 10/2005 |
| EP | 1 575 069 | 9/2005 |

(Continued)

OTHER PUBLICATIONS

International Search Report and Written Opinion for Application No. PCT/IB2011/051667 dated Aug. 9, 2011.

(Continued)

*Primary Examiner* — Christopher E Leiby
(74) *Attorney, Agent, or Firm* — Alston & Bird LLP

(57) ABSTRACT

An apparatus, method, computer program and apparatus wherein the apparatus comprises: a user input device; at least one processor; and at least one memory including computer program code; wherein the at least one memory and the computer program code are configured to, with the at least one processor, enable the apparatus to: control a display to display a user interface item; and associate, in response to actuation of the user input device, a user interface item with a tactile indication so that the tactile indication is provided whenever the user interface item is displayed.

20 Claims, 4 Drawing Sheets

(56) References Cited

U.S. PATENT DOCUMENTS

| | | |
|---|---|---|
| 2006/0103634 A1 | 5/2006 | Kim et al. |
| 2007/0106457 A1 | 5/2007 | Rosenberg |
| 2007/0140667 A1 | 6/2007 | Uchimura |
| 2007/0152974 A1 | 7/2007 | Kim et al. |
| 2007/0152982 A1 | 7/2007 | Kim et al. |
| 2007/0236449 A1 | 10/2007 | Lacroix et al. |
| 2007/0236450 A1 | 10/2007 | Colgate et al. |
| 2007/0247420 A1 | 10/2007 | Strohband et al. |
| 2007/0285402 A1 | 12/2007 | Lim et al. |
| 2008/0010593 A1 | 1/2008 | Uusitalo et al. |
| 2008/0024459 A1 | 1/2008 | Poupyrev et al. |
| 2008/0143693 A1 | 6/2008 | Schena |
| 2008/0303796 A1 | 12/2008 | Fyke |
| 2009/0002140 A1 | 1/2009 | Higa |
| 2009/0007758 A1 | 1/2009 | Schlosser |
| 2009/0015560 A1 | 1/2009 | Robinson et al. |
| 2009/0033617 A1 | 2/2009 | Lindberg et al. |
| 2009/0075694 A1 | 3/2009 | Kim et al. |
| 2009/0128376 A1 | 5/2009 | Caine et al. |
| 2009/0128503 A1 | 5/2009 | Grant et al. |
| 2009/0189873 A1 | 7/2009 | Peterson et al. |
| 2009/0195861 A1 | 8/2009 | Jendbro et al. |
| 2009/0250267 A1 | 10/2009 | Heubel et al. |
| 2009/0303175 A1 | 12/2009 | Koivunen |
| 2009/0315832 A1 | 12/2009 | Gray |
| 2009/0322498 A1 | 12/2009 | Yun et al. |
| 2010/0013653 A1 | 1/2010 | Birnbaum et al. |
| 2010/0053078 A1 | 3/2010 | Kim et al. |
| 2010/0060475 A1 | 3/2010 | Choi |
| 2010/0079410 A1 | 4/2010 | Minton |
| 2010/0088654 A1 | 4/2010 | Henhoeffer |
| 2010/0097323 A1 | 4/2010 | Edwards et al. |
| 2010/0141606 A1 | 6/2010 | Bae et al. |
| 2010/0238114 A1* | 9/2010 | Vartanian et al. ............ 345/168 |

FOREIGN PATENT DOCUMENTS

| | | |
|---|---|---|
| EP | 2 073 508 A1 | 6/2009 |
| GB | 2 463 012 A | 3/2010 |
| TW | 200638238 A | 11/2006 |
| TW | 200937256 A | 9/2009 |
| WO | WO 03/050754 A1 | 6/2003 |
| WO | WO 2008/037275 A1 | 4/2008 |
| WO | WO 2009/097866 A1 | 8/2009 |
| WO | WO 2010/070604 A1 | 6/2010 |

OTHER PUBLICATIONS

Office Action for U.S. Appl. No. 12/767,349, dated Aug. 16, 2012.
International Search Report and Written Opinion for Application No. PCT/IB2011/051727 dated Aug. 17, 2011.
International Search Report and Written Opinion for Application No. PCT/IB2011/051695 dated Aug. 15, 2011.
Office Action for U.S. Appl. No. 12/767,367 dated Nov. 21, 2012.
Office Action for U.S. Appl. No. 12/767,367 dated May 21, 2013.
Advisory Action for. U.S. Appl. No. 12/767,367 dated Aug. 5, 2013.
Office Action for U.S. Appl. No. 12/767,367 dated Sep. 12, 2013.
Office Action for U.S. Appl. No. 12/767,367 dated Dec. 30, 2013.
Office Action for U.S. Appl. No. 12/767,367 dated Aug. 12, 2014.
Office Action for U.S. Appl. No. 12/767,349 dated Aug. 16, 2012.
Office Action for U.S. Appl. No. 12/767,349 dated Mar. 21, 2013.
Office Action for U.S. Appl. No. 12/767,349 dated Sep. 6, 2013.
Office Action for U.S. Appl. No. 12/767,349 dated Dec. 16, 2013.
Office Action for U.S. Appl. No. 12/767,349 dated Apr. 9, 2014.
Office Action for U.S. Appl. No. 12/767,349 dated Sep. 5, 2014.
Office Action from Canadian Application No. 2,797,340 dated Jun. 4, 2014.
Office Action and Search Report for Taiwanese Application No. 100114281 dated Jul. 1, 2015.
Office Action for U.S. Appl. No. 12/767,349 dated Nov. 20, 2015.
Office Action for Chinese Application No. 201180021017.X dated Jul. 27, 2015.
Office Action for Taiwanese Application No. 100114280 dated Jun. 30, 2015.
Office Action for Chinese Application No. 201180021017.X dated Dec. 17, 2014.
Office Action for U.S. Appl. No. 12/767,367 dated Dec. 31, 2014.
Office Action for U.S. Appl. No. 12/767,349 dated Jan. 9, 2015.
Office Action for U.S. Appl. No. 12/767,349 dated Apr. 14, 2016.
Office Action for Chinese Application No. 201180021017.X dated Jun. 2, 2016.
Office Action for Chinese Application No. 201180021017X dated Dec. 29, 2015.
Office Action for U.S. Appl. No. 12/767,349 dated Dec. 21, 2016.
Extended European Search Report for European Patent Application No. 11774505.9 dated Nov. 21, 2016, 6 pages.
Extended European Search Report for European Patent Application No. 11774507.5 dated Nov. 21, 2016, 8 pages.
Extended European Search Report for European Patent Application No. 11774510.9 dated Nov. 21, 2016, 9 pages.
Notice of Allowance for U.S. Appl. No. 12/767,367 dated Apr. 11, 2017, 16 pages.
Notice of Allowance for U.S. Appl. No. 12/767,349, dated Jun. 20, 2017, 9 pages.
SemFeel: A User Interface with Semantic Tactile Feedback for Mobile Touch-Screen Devices [online] [retrieved May 12, 2017]. Retrieved from the Internet: <URL: http://iis-lab.org/paper/UIST2009.pdf>. 10 pages.

* cited by examiner

APPARATUS, METHOD, COMPUTER PROGRAM AND USER INTERFACE

FIELD OF THE INVENTION

Embodiments of the present invention relate to an apparatus, method, computer program and user interface. In particular, they relate to an apparatus, method, computer program and user interface which is simple and convenient for a user to use.

BACKGROUND TO THE INVENTION

Apparatus which enable a user to make inputs via a user input device are well known. The apparatus may be configured to perform a plurality of different functions or store a plurality of different pieces of information. A user needs to be able to distinguish between the different functions and the different pieces of information to enable them to operate the apparatus effectively.

BRIEF DESCRIPTION OF VARIOUS EMBODIMENTS OF THE INVENTION

According to various, but not necessarily all, embodiments of the invention there is provided an apparatus comprising: a user input device; at least one processor; and at least one memory including computer program code; wherein the at least one memory and the computer program code are configured to, with the at least one processor, enable the apparatus to: control a display to display a user interface item; and associate, in response to actuation of the user input device, a user interface item with a tactile indication so that the tactile indication is provided whenever the user interface item is displayed.

In some embodiments of the invention the at least one memory and the computer program code may be configured to, with the at least one processor, enable the apparatus to select, in response to a user input, a tactile indication to be associated with a user interface item.

In some embodiments of the invention the at least one memory and the computer program code may be configured to, with the at least one processor, enable the apparatus to store information in a database indicating the selected tactile indication which is associated with a user interface item.

In some embodiments of the invention the at least one memory and the computer program code may be configured to, with the at least one processor, enable the apparatus to determine that a user interface item is displayed on the display and, in response to the determination, access the database to find the tactile indication associated with the user interface item and control the apparatus to provide the associated tactile indication.

In some embodiments of the invention the tactile indication may comprise an output which may be perceived by the user through the sense of touch. The tactile indication may comprise a raised portion of the user input device. The tactile indication may comprise an indented portion of the user input device.

In some embodiments of the invention the tactile indication may be provided by an electroactive polymer.

In some embodiments of the invention the user interface item may comprise a user selectable item which enables a function to be performed in response to selection of the item.

In some embodiments of the invention a plurality of user interface items may be provided and a user may select different user interface items to be associated with different tactile indications.

In some embodiments of the invention a tactile indication may be used to link a plurality of user interface items together.

In some embodiments of the invention the user input device may comprise a touch sensitive display. The tactile indication may be provided by changing the topology of the touch sensitive display. The tactile indication may be provided in the portion of the display in which the user interface item is displayed or the tactile indication may be provided in a portion of the display close to the portion of the display in which the user interface item is displayed.

According to various, but not necessarily all, embodiments of the invention there may also be provided a method comprising: controlling a display to display a user interface item; and associating, in response to actuation of a user input device, a user interface item with a tactile indication so that the tactile indication is provided whenever the user interface item is displayed.

In some embodiments of the invention the method may also comprise selecting, in response to a user input, a tactile indication to be associated with a user interface item.

In some embodiments of the invention the method may also comprise storing information in a database indicating the selected tactile indication which is associated with a user interface item.

In some embodiments of the invention the method may also comprise determining that a user interface item is displayed on the display and, in response to the determination, accessing the database to find the tactile indication associated with the user interface item and controlling the apparatus to provide the associated tactile indication.

In some embodiments of the invention the tactile indication may comprise an output which may be perceived by the user through the sense of touch. The tactile indication may comprise a raised portion of the user input device. The tactile indication may comprise an indented portion of the user input device.

In some embodiments of the invention the tactile indication may be provided by an electroactive polymer.

In some embodiments of the invention the user interface item may comprise a user selectable item which enables a function to be performed in response to selection of the item.

In some embodiments of the invention a plurality of user interface items may be provided and a user may select different user interface items to be associated with different tactile indications.

In some embodiments of the invention a tactile indication may be used to link a plurality of user interface items together.

In some embodiments of the invention the user input device may comprise a touch sensitive display. The tactile indication may be provided by changing the topology of the touch sensitive display. The tactile indication may be provided in the portion of the display in which the user interface item is displayed. The tactile indication may be provided in a portion of the display close to the portion of the display in which the user interface item is displayed.

According to various, but not necessarily all, embodiments of the invention there may also be provided a computer program comprising computer program instructions that, when executed by at least one processor, enable an apparatus at least to perform: controlling a display to display a user interface item; and associating, in response to actuation of a user input device, a user interface item with a tactile indication so that the tactile indication is provided whenever the user interface item is displayed.

In some embodiments of the invention the computer program may comprise program instructions for causing a computer to perform the method as described above.

In some embodiments of the invention there may also be provided a physical entity embodying the computer program as described above.

In some embodiments of the invention there may also be provided an electromagnetic carrier signal carrying the computer program as described above.

According to various, but not necessarily all, embodiments of the invention there may also be provided a user interface comprising: a user input device; and a display; wherein the user input device enables a user to associate a user interface item with a tactile indication so that the tactile indication is provided whenever the user interface item is displayed on the display.

In some embodiments of the invention the tactile indication may comprise an output which may be perceived by the user through the sense of touch.

According to various, but not necessarily all, embodiments of the invention there may also be provided an apparatus comprising: means for controlling a display to display a user interface item; and means for associating, in response to actuation of a user input device, a user interface item with a tactile indication so that the tactile indication is provided whenever the user interface item is displayed.

The apparatus may be for wireless communication.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
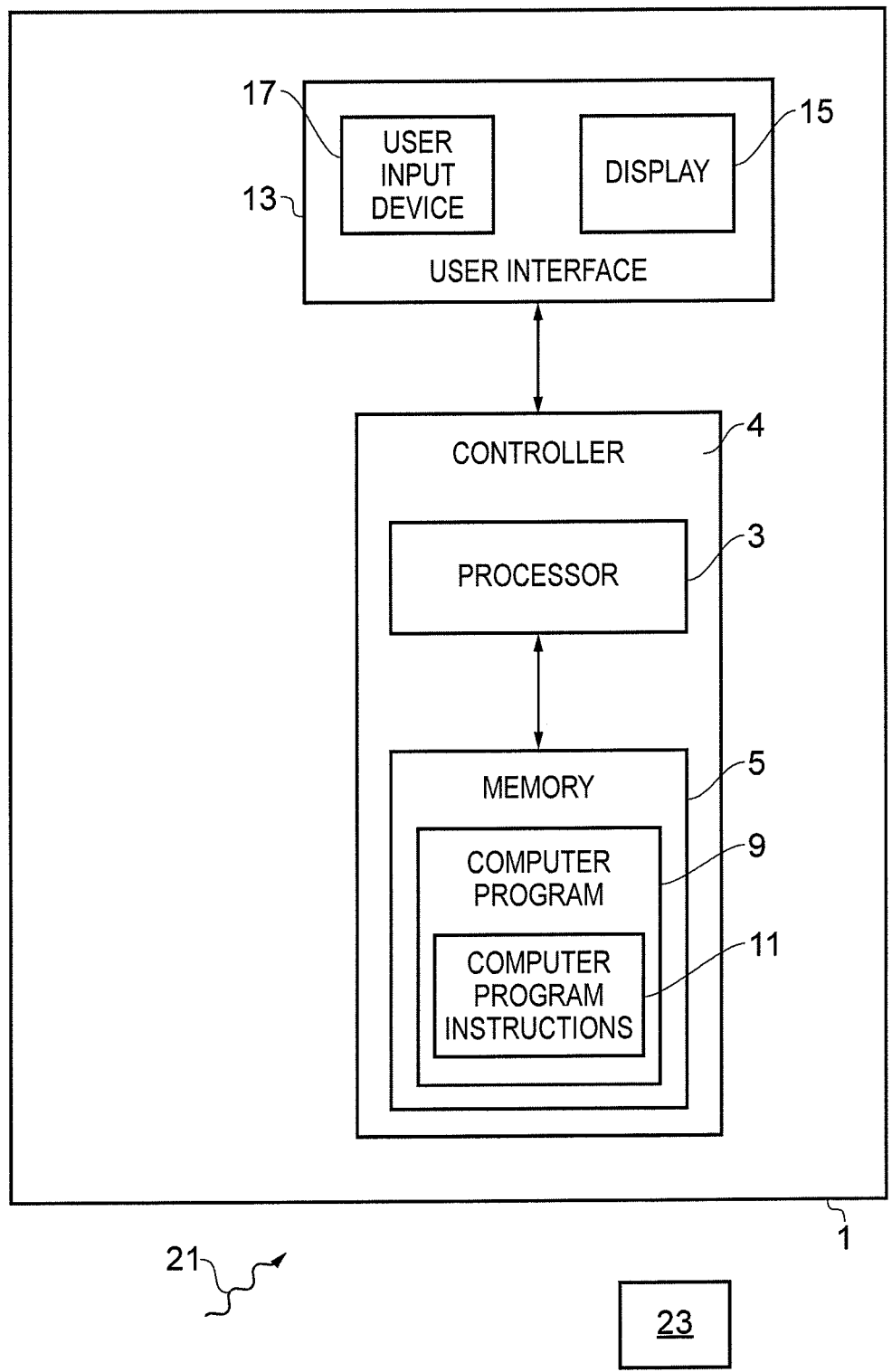
FIG. 1 schematically illustrates an apparatus according to an exemplary embodiment of the invention.

The Figures illustrate an apparatus 1, method, computer program and apparatus wherein the apparatus 1 comprises: a user input device 17; at least one processor 3; and at least one memory 5 including computer program code 9; wherein the at least one memory 5 and the computer program code 9 are configured to, with the at least one processor 3, enable the apparatus 1 to: control a display 15 to display a user interface item 61A, 61B, 61C, 61D; and associate, in response to actuation of the user input device 17, a user interface item 61A, 61B, 61C, 61D with a tactile indication 63A, 63B, 63C, 63D so that the tactile indication 63A, 63B, 63C, 63D is provided whenever the user interface item 61A, 61B, 61C, 61D is displayed.

FIG. 1 schematically illustrates an apparatus 1 according to an exemplary embodiment of the invention. The apparatus 1 may be an electronic apparatus. The apparatus 1 may be, for example, a mobile cellular telephone, a personal computer, a camera, a gaming device, a personal digital assistant, a personal music player or any other apparatus which enables a user to make user inputs to control the apparatus 1. The apparatus 1 may be a handheld apparatus 1 which can be carried in a user's hand, handbag or jacket pocket for example.

Only features referred to in the following description are illustrated in FIG. 1. However, it should be appreciated that the apparatus 1 may comprise additional features that are not illustrated. For example, in embodiments of the invention where the apparatus 1 is a mobile cellular telephone, the apparatus 1 may also comprise a transmitter and receiver configured to enable wireless communication.

The apparatus 1 illustrated in FIG. 1 comprises: a user interface 13 and a controller 4. In the illustrated embodiment the controller 4 comprises at least one processor 3 and at least one memory 5 and the user interface 13 comprises a display 15 and a user input device 17.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send messages or access communication networks such as local area networks or the internet.

The controller 4 may also be configured to enable the apparatus 1 to control the display 15 to display a user interface item 61; and associate, in response to actuation of the user input device 17, a user interface item 61 with a tactile indication 63 so that the tactile indication 63 is provided whenever the user interface item 61 is displayed.

The at least one processor 3 is configured to receive input commands from the user interface 13 and also to provide output commands to the user interface 13. The at least one processor 3 is also configured to write to and read from the at least one memory 5. The outputs of the user interface 13 are provided as inputs to the controller 4.

In the exemplary embodiment illustrated in FIG. 1 the user interface 13 comprises a user input device 17 and a display 15.

The user input device 17 may comprise any means which enables a user of the apparatus 1 to input information which may be used to control the apparatus 1. The user input device 17 may also enable a user to input information which may be stored in the one or more memories 5 of the apparatus 1. The user input device 17 may comprise a touch sensitive display, a keypad or a combination of a number of different types of user input devices.

The display 15 may comprise any means which enables information to be displayed to a user of the apparatus 1. The information may correspond to information which has been input by the user via the user input device 17, information which is stored in the one or more memories 5 or information which has been received by apparatus 1.

In some embodiments of the invention the user input device 17 and the display 15 may be combined to provide a touch sensitive display which both enables information to be displayed to a user and enables a user to make user inputs.

Figure 2:
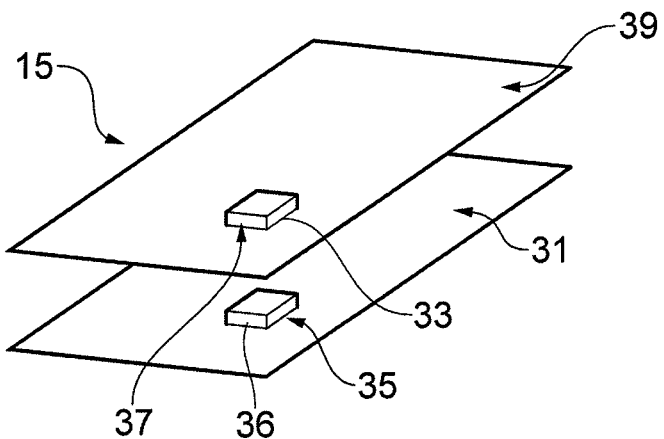
FIG. 2 illustrates a touch sensitive display configured to provide a tactile indication according to an exemplary embodiment of the invention.

In embodiments of the invention the user interface 13 may also be configured to provide a tactile indication 63 to a user. The tactile indication 63 may comprise an output which the user may sense through touch. For example, the tactile indication 63 may comprise a raised portion or an indented portion of a touch sensitive display 15, a change in the texture of the surface of part of the user input device 17 or a change in the shape of a key of a user input device 17. Examples of tactile indications are illustrated in FIG. 2 and FIG. 5B.

The at least one memory 5 stores a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIGS. 4A and 4B. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for controlling a display 15 to display a user interface item 61; and means for associating, in response to actuation of a user input device 17, a user interface item with a tactile indication 63 so that the tactile indication 63 is provided whenever the user interface item 61 is displayed.

The computer program code 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program code 9. The delivery mechanism may be a signal configured to reliably transfer the computer program code 9. The apparatus 1 may propagate or transmit the computer program code 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application integration specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

FIG. 2 illustrates a touch sensitive display 15 configured to provide a tactile indication 63 according to an embodiment of the invention. In this particular embodiment the tactile indication 61 comprises a projection 37 in the surface of the touch sensitive display 15.

In the illustrated embodiment the touch sensitive display 15 comprises a flexible surface layer 39 overlaying an electroactive polymer (EAP) layer 31. The flexible surface layer 39 may comprise part of the outer surface of the apparatus 1. The flexible surface layer 39 may be actuated by a user. The actuation may comprise a user touching the flexible surface layer 39 with a device such as a finger or a stylus.

The electroactive polymer (EAP) layer 31 is provided underneath the flexible surface layer 39. The electroactive polymer may comprise any material which changes shape when a voltage is applied to it. The EAP layer 31 may be configured to provide localized changes in topology. That is, the EAP layer 31 may be configured so that a first portion of the EAP layer 31 may be raised or lowered with respect to the other portions of the EAP layer 31. The EAP layer 31 may be provided as a grid of EAP elements. The voltage across the EAP layer 31 may be controlled by the controller 4 thereby enabling the controller 4 to control the topology of the EAP layer 31. The controller 4 may control when the topology of the EAP layer 31 is changed.

The EAP layer 31 is positioned underneath the flexible surface layer 39 so that any change in the topology of the EAP layer 31 causes a corresponding change in the topology of the flexible surface layer 39.

In the embodiment illustrated in FIG. 2 a voltage has been applied to a first portion 35 of the EAP layer 31. This has caused the first portion 35 to become raised with respect to the rest of the EAP layer 31 so that the first portion 35 comprises a projection 36. The projection 36 in the first portion 35 of the EAP layer 31 also deforms the flexible surface layer 39 so that a corresponding projection 37 is provided in a first portion 33 of the flexible surface layer 39 overlaying the first portion 35 of the EAP layer 31. A user can feel the projection when they touch the flexible surface layer 39 so the projection 37 may be used to provide a tactile indication 63 to a user.

Figure 3:
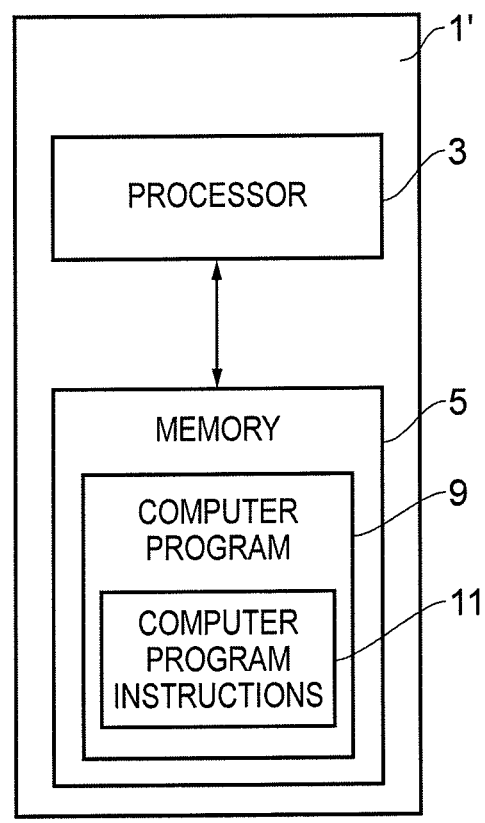
FIG. 3 illustrates a touch sensitive display configured to provide a tactile indication according to a second exemplary embodiment of the invention.

FIG. 3 illustrates an apparatus 1' according to another embodiment of the invention. The apparatus 1' illustrated in FIG. 3 may be a chip or a chip-set. The apparatus 1' comprises at least one processor 3 and at least one memory 5 as described above in relation to FIG. 1.

Figure 4A:
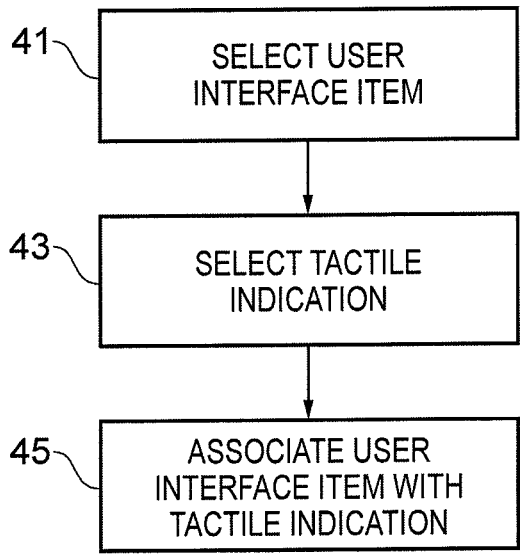
FIGS. 4A to 4B are block diagrams which schematically illustrate a method according to an exemplary embodiment of the invention.
Figure 4B:
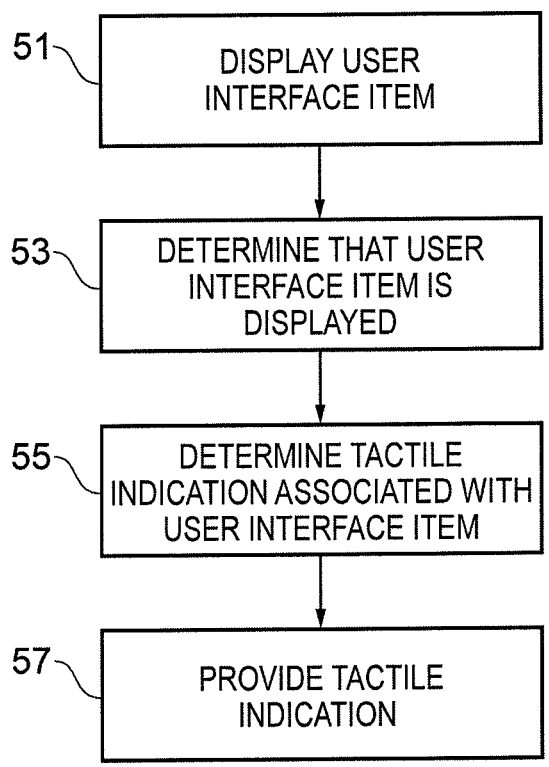

A method of controlling the apparatus 1, according to embodiments of the invention, is illustrated schematically in FIGS. 4A and 4B.

FIG. 4A illustrates a method of enabling a user to control an apparatus 1 to associate a tactile indication 63 with a user interface item 61. At block 41 the user selects a user interface item 61. The user interface item 61 may comprise any item which may be displayed on the display 15. The user interface item 61 may be associated with a function so that in response to the actuation of the user interface item 61 a control signal is provided to the controller 4 to enable the function to be performed. Alternatively, or in addition, the user interface item 61 may be associated with a piece of content so that when the user interface item 61 is actuated the content is obtained and/or rendered. The content may be, for example, a piece of information which has been input by the user such as a set of contact details in a phone book application. The user interface item 61 may comprise a visual indication of the function or content associated with the user interface item 61. For example the user interface item 61 may comprise a label or an image indicative of the associated function or content.

One or more user interface items 61 may be presented on the display 15 simultaneously. The user may be able to select a user interface item 61 using the user input device 17. In embodiments of the invention where the user input device 17 is a touch sensitive display 15 a user may select a user interface item 61 by highlighting the area of the display 15 in which the user interface item 61 is displayed. A user may highlight an area of the display 15 by making a specific type of input, such as a long press input or a trace input. The specific type of input may cause the user interface item 61 to be selected without causing the function associated with the user interface item 61 to be performed or the content associated with the user interface item 61 to be accessed.

At block 43 the user selects a tactile indication 63. As mentioned above, the tactile indication 63 comprises an output which the user may sense through touch.

A user may be able to select different types of tactile indications 63. For example a user may be able to select whether the tactile indication 63 is a projection or an indentation or a change in surface texture. The user may also be able to select the size and shape of the tactile indication 63. The user may also be able to select the position of the tactile indication 63 relative to the user interface item 61. For example, the user may be able to select whether the tactile indication 63 is provided in the area of the display 15 in which the user interface item 61 is displayed or in an area adjacent to the user interface item 61. The user may select the tactile indication 63 from a menu of available tactile indications 63.

In some embodiments of the invention the user may be able to design their own tactile indication 63. The personally designed tactile indication 63 may be added to as a selectable option to a menu of pre-programmed tactile indications 63.

At block 45 the selected user interface item 61 is associated with the selected tactile indication 63. Information indicating that the selected user interface item 61 is associated with the selected tactile indication 63 may be stored in a database. The database may be stored in the one or more memories 5 and may be accessed by the controller 4.

FIG. 4B illustrates a method of providing a tactile indication 63 in accordance with embodiments of the invention. At block 51 a user interface item 61 is displayed on the display 15. The user interface item 61 may be one of a plurality of user interface items 61 which are displayed on the display 15.

At block 53 the controller 4 determines that the user interface item 61 is currently displayed on the display 15. The controller 4 may determine whether or not the user interface item 61 is displayed by detecting the mode of operation of the apparatus 1. For example, the controller 4 may detect when an application or function within an application has been accessed.

At block 55 the controller 4 determines the tactile indication 63 which is associated with the displayed user interface item 61. The controller 4 may access a database to find which, if any, tactile indication 63 is associated with the displayed user interface item 61.

At block 57 the tactile indication 63 is provided. In embodiments of the invention where the user input device 17 comprises a touch sensitive display 15 the tactile indication 63 may be provided in the area of the display 15 in which the user interface item 61 is displayed or in an area close to it.

The tactile indication 63 may be provided whenever the user interface item 61 is displayed on the display 15. Blocks 51 to 57 may be repeated whenever the user interface item 61 is displayed. If the user changes which user interface items 61 are displayed on the display 15, for example, if the user access a different application or scrolls through a menu so that the user interface item 61 is no longer displayed, the controller 4 controls the apparatus 1 so that the tactile indication 63 is no longer provided.

The blocks illustrated in FIGS. 4A and 4B may represent operations in a method and/or sections of code in the computer program 9. The illustration of a particular order to the blocks does not necessarily imply that there is a required or preferred order for the blocks and the order and arrangement of the block may be varied. For example, in FIG. 4A the tactile indication 63 may be selected before the user interface item 61 or vice versa. Furthermore, it may be possible for some blocks to be omitted.

Figure 5A:
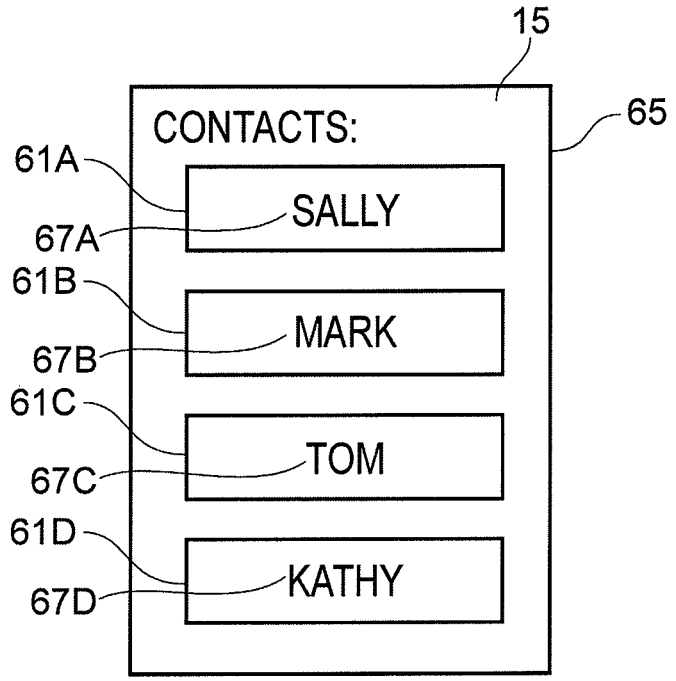
FIGS. 5A to 5B illustrate an exemplary embodiment of the invention in use.
Figure 5B:
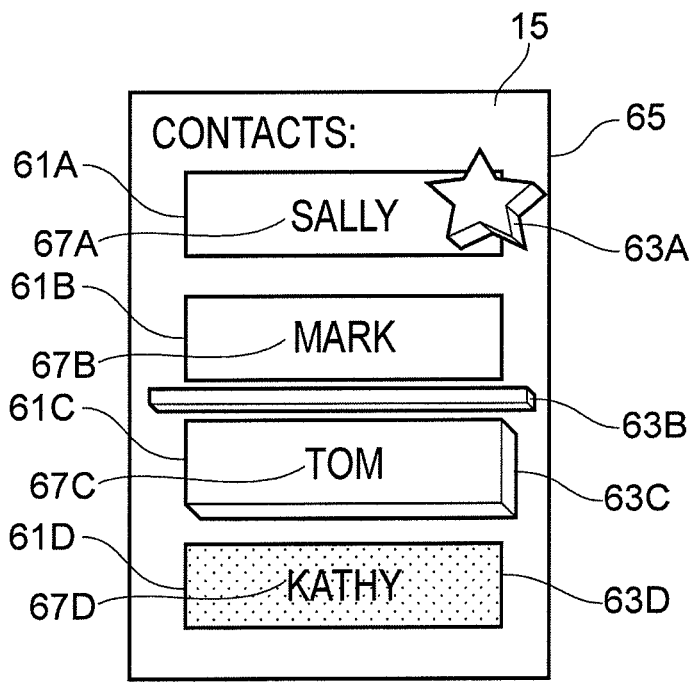

FIGS. 5A and 5B illustrate a user interface 65 according to an embodiment of the invention. The user interface 65 may be displayed on the display 15. In the particular embodiment illustrated in FIGS. 5A and 5B the display 15 is a touch sensitive display 15. The touch sensitive display 15 may comprise a flexible surface layer 39 and an EAP layer 31 as described above in relation to FIG. 2.

In FIG. 5A the user has accessed a phone book application. A plurality of user interface items 61A, 61B, 61C, 61D are displayed on the display 15. Each of the user interface items 61A, 61B, 61C, 61D are associated with a set of contact details. The contact details may be stored in the one or more memories 5 of the apparatus 1. The contact details may be accessed by actuating the user interface items 61A, 61B, 61C, 61D.

Each of the user interface items 61A, 61B, 61C, 61D comprises a label 67A, 67B, 67C, 67D indicative of the contact details associated with the user interface item 61. In this particular embodiment the label 67 comprises the name of the contact.

In FIG. 5A the user interface items 61A, 61B, 61C, 61D have not been associated with any tactile indications 63. The touch sensitive display 15 is substantially flat so that the user cannot distinguish between the user interface items 61A, 61B, 61C, 61D by touch. The touch sensitive display 15 does not comprise any projections or indentations or changes in surface texture which may be felt by a user.

FIG. 5B illustrates a user interface 65 which is provided after the user has selected tactile indications 63A, 63B, 63C, 63D to be associated with each of the user interface items 61A, 61B, 61C, 61D. The controller 4 has determined which user interface items 61A, 61B, 61C, 61D are displayed and has accessed a database to find which, if any, tactile indication 63A, 63B, 63C, 63D is associated with each of the user interface items 61A, 61B, 61C, 61D. The controller 4 has then controlled the voltage across the EAP layer 31 to change the local topology of the EAP layer 31 and flexible surface layer 39 to provide the appropriate tactile indications 63A, 63B, 63C, 63D.

The first user interface item 61A is associated with a first tactile indication 63A. The first tactile indication 63A comprises a projection which is provided overlapping the area of the display 15 in which the first user interface item 61A is displayed. In the illustrated embodiment the projection is star-shaped. It is to be appreciated that any shape of projection may be provided.

The second user interface item 61B is associated with a second tactile indication 63B. The second tactile indication 63B comprises a projection which is provided adjacent to the area of the display 15 in which the second user interface item 63A is displayed. The projection comprises a substantially linear raised portion which extends between the second user interface item 61B and the third user interface item 61C. The raised portion acts as a physical barrier to separate the two user interface items 61 and may be used to group user interface items 61 together so that a user can distinguish between different groups of user interface items 61. For example, all of the user interface items 61A, 61B provided above the raised portion may be associated with a first type of content while the user interface items 63C, 63D provided below the raised portion may be associated with a second type of content. In the illustrated embodiment the user interface items 61A, 61B provided above the bump may be associated with contacts who are work colleagues while the user interface items 63C, 63D provided below the bump may be associated with contacts who are family or friends.

The third user interface item 61C is associated with a third tactile indication 63C. The third tactile indication 63C comprises a projection which is provided in the area of the display 15 in which the third user interface item 61C is displayed. The third tactile indication 63C comprises a raised portion which is substantially the same size and shape as the third user interface item 61C so that the whole of the third user interface item 61C is raised relative to the other portions of the display 15.

The fourth user interface item 61D is associated with a fourth tactile indication 63D. The fourth tactile indication 63D comprises a change in the surface texture of the display 15. The change in the surface texture is provided in the area of the display 15 in which the fourth user interface item 61D is displayed.

Embodiments of the invention provide the advantage that they enable a user to program an apparatus to make it simpler and more convenient for their own personal use.

The user may select tactile indications to be associated with user interface items which they find intuitive or easy to remember.

The use of the tactile indication provides several advantages. It enables the user to distinguish between different user interface items by touch. This reduces the likelihood of inadvertently actuating the wrong user interface item as the user can feel whether or not they have touched the right user interface item. This may also enable the user to operate the apparatus without having to look at the apparatus. For example, the user may be using a telephone in hands free mode while driving car.

Also the tactile indications may be used to link groups of user interface items together. As in the above described embodiment the tactile indication may act as a physical barrier between the different user interface items. This provides an intuitive way of grouping items together. This also reduces the risk of inadvertently actuating the wrong user interface item as there is a physical barrier between the different items.

In some embodiments of the invention the user may be able to move the tactile indication 63 across a touch sensitive display 15. For example, in some embodiments of the invention the user may perform a drag and drop action with the user interface item 61. The user may make a trace input beginning on the user interface item 61 and the user interface item 61 may move as the user moves their finger across the surface of the display 15. In embodiments of the invention the tactile indication 63 associated with the user input item 61 may also move as the user makes the input.

Although embodiments of the present invention have been described in the preceding paragraphs with reference to various examples, it should be appreciated that modifications to the examples given can be made without departing from the scope of the invention as claimed. For example in the above described embodiments the localized projections or indentations are provided by an EAP layer. In other embodiments of the invention the localized projections may be provided by any other suitable means such as a mechanical or fluid pumping system or a piezo electric transducer.

In the above described embodiments the tactile indication is provided on a touch sensitive display. It is to be appreciated that the tactile indication may be provided by other parts of an apparatus such as a keypad or any other part of the apparatus which is likely to be touched by the user. For example, the tactile indication could be provided by other means such as a vibration module of an electrostatic feedback.

Also in some embodiments of the invention the user may select a visual indication so that the visual indication may be provided in addition to or as an alternative to the tactile indication.

In some embodiments of the invention the tactile indication may also depend on the context of the apparatus. The tactile indication may be provided whenever predetermined context criteria are satisfied. For example a tactile indication associated with a set of contact information may be provided whenever the contact is available for an instant messaging service. This provides the user with a tactile indication of the context of the apparatus.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   at least one processor; and
   at least one memory including computer program code;
   wherein the at least one memory and the computer program code are configured to, with the at least one processor, enable the apparatus to:
   receive input from a user selecting a user interface item and selecting a tactile indication wherein the apparatus is configured to enable the user interface item to be selected before or after the tactile indication; and
   store information indicating that the user interface item is associated with the user selected tactile indication in a database so that the user selected tactile indication is provided whenever the user interface item is displayed.

2. An apparatus as claimed in claim 1 wherein the at least one memory and the computer program code are configured to, with the at least one processor, enable the apparatus to determine that a user interface item is displayed on the display and, in response to the determination, access the database to find the user selected tactile indication associated with the user interface item and control the apparatus to provide the associated user selected tactile indication.

3. An apparatus as claimed in claim 1 wherein the tactile indication comprises an output which may be perceived by the user through the sense of touch.

4. An apparatus as claimed in claim 1 wherein the tactile indication comprises a raised portion of a user input device.

5. An apparatus as claimed in claim 1 wherein the tactile indication comprises an indented portion of a user input device.

6. An apparatus as claimed in claim 1 wherein the tactile indication is provided by an electroactive polymer.

7. An apparatus as claimed in claim 1 wherein the user interface item comprises a user selectable item which enables a function to be performed in response to actuation of the item.

8. An apparatus as claimed in claim 1 wherein a plurality of user interface items are provided and a user may select different user interface items to be associated with different tactile indications.

9. An apparatus as claimed in claim 1 wherein a tactile indication is used to link a plurality of user interface items together.

10. An apparatus as claimed in claim 1 wherein the user input device comprises a touch sensitive display.

11. An apparatus as claimed in claim 10 wherein the tactile indication is provided by changing the topology of the touch sensitive display.

12. An apparatus as claimed in claim 11 wherein the tactile indication is provided in the portion of the display in which the user interface item is displayed.

13. An apparatus as claimed in claim 11 wherein the tactile indication is provided in a portion of the display close to the portion of the display in which the user interface item is displayed.

14. An apparatus as claimed in claim 7 wherein the at least one memory and the computer program code are configured to cause the user interface item to be selected without causing a function associated with the user interface item to be performed.

15. A method comprising:
receiving input from a user selecting a user interface item and selecting a tactile indication wherein the method enables the user interface item to be selected before or after the tactile indication; and
storing information indicating that the user interface item is associated with the user selected tactile indication in a database so that the user selected tactile indication is provided whenever the user interface item is displayed.

16. A method as claimed in claim 15 wherein the tactile indication comprises an output which may be perceived by the user through the sense of touch.

17. A non-transitory computer program product comprising at least one computer-readable medium having program instructions stored therein for causing a computer to perform the method of claim 15.

18. A method as claimed in claim 15 wherein the user interface item comprises a user selectable item which enables a function to be performed in response to actuation of the item and wherein the user interface item is selected without causing a function associated with the user interface item to be performed.

19. A non-transitory computer program product comprising at least one computer-readable medium having computer program instructions stored therein that, when executed by at least one processor, enable an apparatus at least to perform:
receiving input from a user selecting the user interface item and selecting a tactile indication wherein the apparatus is configured to enable the user interface item to be selected before or after the tactile indication; and
storing information indicating that the user interface item is associated with a selected tactile indication in a database so that the tactile indication is provided whenever the user interface item is displayed.

20. A non-transitory computer program product as claimed in claim 19 wherein the user interface item comprises a user selectable item which enables a function to be performed in response to actuation of the item and wherein the user interface item is selected without causing a function associated with the user interface item to be performed.

* * * * *